US012308578B2

(12) United States Patent
Long et al.

(10) Patent No.: US 12,308,578 B2
(45) Date of Patent: May 20, 2025

(54) RECEPTACLE CAGE HAVING ABSORBER

(71) Applicant: TE Connectivity Solutions GmbH, Schaffhausen (CH)

(72) Inventors: Richard James Long, Columbia, PA (US); Alex Michael Sharf, Harrisburg, PA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 352 days.

(21) Appl. No.: 17/839,446

(22) Filed: Jun. 13, 2022

(65) Prior Publication Data

US 2023/0402799 A1 Dec. 14, 2023

(51) Int. Cl.

| | |
|---|---|
| ***H01R 13/6587*** | (2011.01) |
| ***H01R 12/72*** | (2011.01) |
| ***H01R 13/514*** | (2006.01) |
| ***H01R 13/659*** | (2011.01) |

(52) U.S. Cl.

CPC ....... *H01R 13/6587* (2013.01); *H01R 12/722* (2013.01); *H01R 13/514* (2013.01); *H01R 13/659* (2013.01)

(58) Field of Classification Search

CPC ......................... H01R 13/6587; H01R 13/514; H01R 13/659; H01R 13/6598; H01R 13/6599; H01R 12/722

USPC .......................................... 439/607.2, 607.21

See application file for complete search history.

(56) References Cited

U.S. PATENT DOCUMENTS

| | | | | |
|---|---|---|---|---|
| 5,934,934 A * | 8/1999 | Ward | H01R 13/6599 | 439/620.09 |
| 7,037,136 B1 * | 5/2006 | Korsunsky | H01R 13/6594 | 361/728 |
| 7,070,446 B2 * | 7/2006 | Henry | H01R 13/659 | 439/541.5 |
| 7,170,013 B2 * | 1/2007 | Lewis | H05K 9/0016 | 174/355 |
| 7,438,596 B2 | 10/2008 | Phillips | | |
| 7,455,554 B2 * | 11/2008 | Long | G02B 6/4256 | 439/607.17 |
| 7,704,097 B1 * | 4/2010 | Phillips | H05K 9/0058 | 439/607.21 |
| 7,758,381 B2 * | 7/2010 | Oki | H01R 13/6582 | 439/607.17 |
| 7,845,975 B2 * | 12/2010 | Cheng | H01R 13/658 | 439/541.5 |
| 8,277,252 B2 * | 10/2012 | Fogg | H01R 13/6477 | 439/607.25 |
| 8,545,267 B2 | 10/2013 | Fogg et al. | | |
| 8,545,268 B2 | 10/2013 | Fogg et al. | | |

(Continued)

OTHER PUBLICATIONS

Extended European Search Report, European Application No., 23178404.2-1201, European Filing Date, Oct. 27, 2023.

*Primary Examiner* — Marcus E Harcum

(57) ABSTRACT

A receptacle cage includes conductive cage walls forming a cavity defining a module channel configured to receive a pluggable module. The cage walls include an upper wall above the module channel and a lower wall below the module channel. The cage walls include a port at a front of the receptacle cage providing access to the module channel. The receptacle cage includes an upper EMI absorber extending along the upper wall above the module channel and a lower EMI absorber extending along the lower wall below the module channel.

24 Claims, 4 Drawing Sheets

(56) References Cited

U.S. PATENT DOCUMENTS

| | | | | | |
|---|---|---|---|---|---|
| 8,550,861 | B2* | 10/2013 | Cohen | H01R 12/72 | 439/607.05 |
| 8,834,205 | B2* | 9/2014 | Fogg | H01R 13/6587 | 439/607.21 |
| 8,870,595 | B2* | 10/2014 | Schmitt | H01R 13/6587 | 439/607.25 |
| 9,373,901 | B2* | 6/2016 | Singer | H01R 13/6583 | |
| 9,397,450 | B1* | 7/2016 | Feng | H01R 13/7175 | |
| 9,620,906 | B1* | 4/2017 | Briant | H01R 12/722 | |
| 9,620,907 | B1* | 4/2017 | Henry | H01R 13/6582 | |
| 9,666,995 | B1* | 5/2017 | Phillips | H01R 13/6594 | |
| 9,666,997 | B1* | 5/2017 | Henry | H01R 13/659 | |
| 9,728,919 | B1* | 8/2017 | Dunwoody | H01R 13/6582 | |
| 9,831,613 | B2* | 11/2017 | Liu | H01R 13/6583 | |
| 9,869,837 | B2* | 1/2018 | Morgan | G06F 1/181 | |
| 9,882,297 | B2* | 1/2018 | Regnier | H01R 24/30 | |
| 9,972,944 | B1* | 5/2018 | Long | H01R 24/30 | |
| 10,104,793 | B2* | 10/2018 | Briant | G02B 6/4277 | |
| 10,178,804 | B2* | 1/2019 | Sharf | H01R 12/70 | |
| 10,575,442 | B2* | 2/2020 | Bucher | H05K 9/0016 | |
| 11,056,838 | B2* | 7/2021 | Biddle | G02B 6/4277 | |
| 11,114,797 | B2* | 9/2021 | Wang | G02B 6/4284 | |
| 11,437,751 | B2* | 9/2022 | Duan | H01R 13/502 | |
| 2007/0093099 | A1* | 4/2007 | Kuo | H01R 13/6583 | 439/159 |
| 2012/0322308 | A1 | 12/2012 | Fogg et al. | | |
| 2012/0329325 | A1* | 12/2012 | Fogg | H01R 13/6477 | 439/607.25 |
| 2013/0048367 | A1* | 2/2013 | Ljubijankic | H01R 13/6583 | 174/354 |
| 2013/0199835 | A1* | 8/2013 | Janota | H05K 9/0083 | 174/378 |
| 2014/0295704 | A1* | 10/2014 | Curtis | H01R 13/6583 | 439/607.26 |
| 2014/0340864 | A1* | 11/2014 | Wu | H05K 9/0018 | 361/818 |
| 2015/0072561 | A1* | 3/2015 | Schmitt | H01R 13/6581 | 174/359 |
| 2015/0114708 | A1* | 4/2015 | Rossman | H04Q 1/116 | 174/350 |
| 2015/0270649 | A1* | 9/2015 | Blazek | H01R 13/6599 | 439/607.02 |
| 2017/0054234 | A1* | 2/2017 | Kachlic | H01R 13/6583 | |
| 2019/0013630 | A1* | 1/2019 | Yoshino | H01B 9/003 | |
| 2019/0067878 | A1* | 2/2019 | Xie | H01R 13/6583 | |
| 2019/0363494 | A1* | 11/2019 | Sharf | H01R 13/6582 | |
| 2019/0387650 | A1* | 12/2019 | Zhou | G02B 6/4261 | |
| 2020/0106231 | A1* | 4/2020 | Katz | H01R 43/16 | |
| 2020/0212633 | A1* | 7/2020 | Masunaga | H01R 12/79 | |
| 2020/0343673 | A1* | 10/2020 | Poh | H01R 13/6594 | |
| 2021/0050692 | A1* | 2/2021 | Yang | H01R 13/6583 | |
| 2021/0098927 | A1* | 4/2021 | Si | H01R 13/658 | |
| 2021/0203105 | A1* | 7/2021 | Liu | H05K 3/366 | |
| 2021/0384691 | A1* | 12/2021 | Winey | H01R 13/6587 | |
| 2022/0045462 | A1* | 2/2022 | Duan | H01R 13/6587 | |
| 2022/0115816 | A1* | 4/2022 | Huang | H01R 12/75 | |
| 2022/0344875 | A1* | 10/2022 | Yang | H01R 13/6581 | |
| 2023/0366764 | A1* | 11/2023 | Berkel | G01L 19/147 | |

* cited by examiner

RECEPTACLE CAGE HAVING ABSORBER

BACKGROUND OF THE INVENTION

The subject matter herein relates generally to electrical connector systems.

Electrical connector systems are used in data communication applications. For example, input/output (I/O) transceiver modules may be used to communicate data between various components. The transceiver modules are pluggable with receptacle connectors. In various systems, electrical shielding is provided for the connectors. For example, a cage may surround the receptacle connector and create a shielded cavity the receives the pluggable transceiver module. The shielding provided by the cage may reduce electromagnetic interference (EMI) emissions, which may harm the signal integrity and/or electrical performance of the connectors and/or neighboring electrical devices. The EMI shielding of at least some known electrical connector systems may be inadequate because of the increasing signal speeds being transmitted thorough the connectors. For example, EMI leakage paths may exist around the pluggable transceiver module, such as at the port and/or the latching area between the pluggable transceiver module and the cage. EMI leakage becomes increasing problematic at high data rates.

There is a need for an electrical connector system having improved EMI shielding.

BRIEF DESCRIPTION OF THE INVENTION

In one embodiment, a receptacle cage is provided and includes a plurality of cage walls forming a cavity. The cage walls are electrically conductive. The cavity defines a module channel configured to receive a pluggable module. The plurality of cage walls include an upper wall above the module channel and a lower wall below the module channel. The plurality of cage walls include a port at a front of the receptacle cage providing access to the module channel. The pluggable module is plugged into the module channel through the port. The receptacle cage includes an upper EMI absorber extending along the upper wall above the module channel. The receptacle cage includes a lower EMI absorber extending along the lower wall below the module channel. Optionally, a rear EMI absorber may be provided along the rear wall of the receptacle cage.

In another embodiment, a receptacle assembly is provided and includes a receptacle cage configured to be mounted to a host circuit board. The receptacle cage include a plurality of cage walls forming the cavity. The cage walls are electrically conductive. The cavity defines a module channel configured to receive a pluggable module. The plurality of cage walls include an upper wall above the module channel, a lower wall below the module channel, and a rear wall rearward of the module channel. The plurality of cage walls include a port at a front of the receptacle cage providing access to the module channel. The pluggable module is plugged into the module channel through the port. The receptacle assembly includes a receptacle connector received in the cavity of the receptacle cage forward of the rear wall. The receptacle connector includes a housing holding receptacle contacts. The housing has a card slot configured to receive a card edge of a module circuit board of a pluggable module. The receptacle contacts are located in the card slot to electrically connect to the module circuit board. The receptacle contacts are configured to be electrically connected to the host circuit board. The receptacle assembly includes an upper EMI absorber extending along the upper wall above the module channel. The receptacle assembly includes a lower EMI absorber extending along the lower wall below the module channel.

In a further embodiment, an electrical connector system is provided and includes a host circuit board having an upper surface. The electrical connector system includes a receptacle assembly mounted to the upper surface of the host circuit board. The receptacle assembly includes a receptacle cage include a plurality of cage walls forming a cavity, a receptacle connector received in the cavity, an upper EMI absorber received in the cavity, and a lower EMI absorber received in the cavity. The cage walls are electrically conductive and are coupled to the host circuit board. The cavity defines a module channel. The plurality of cage walls include an upper wall above the module channel, a lower wall below the module channel, and a rear wall rearward of the module channel. The upper EMI absorber extending along the upper wall above the module channel. The lower EMI absorber extending along the lower wall below the module channel. The electrical connector system includes a pluggable module received in the module channel and mated to the receptacle connector.

DETAILED DESCRIPTION OF THE INVENTION

Figure 1:
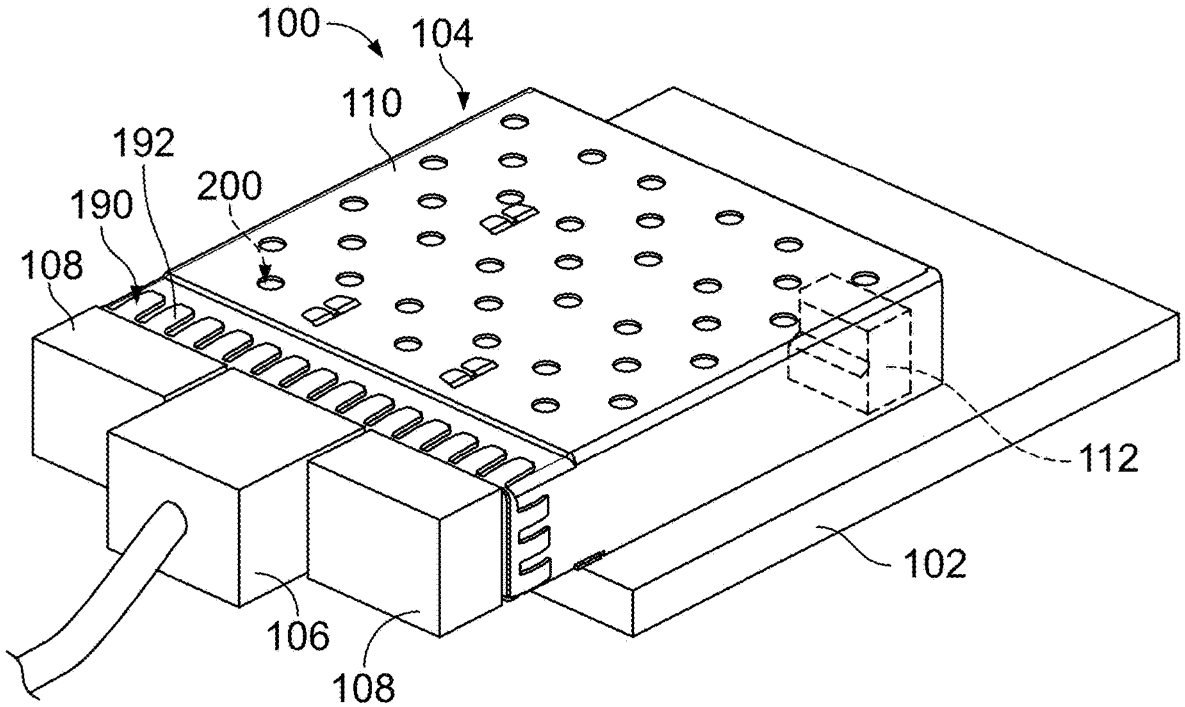
FIG. 1 is a top perspective view of a communication system formed in accordance with an exemplary embodiment.
Figure 2:
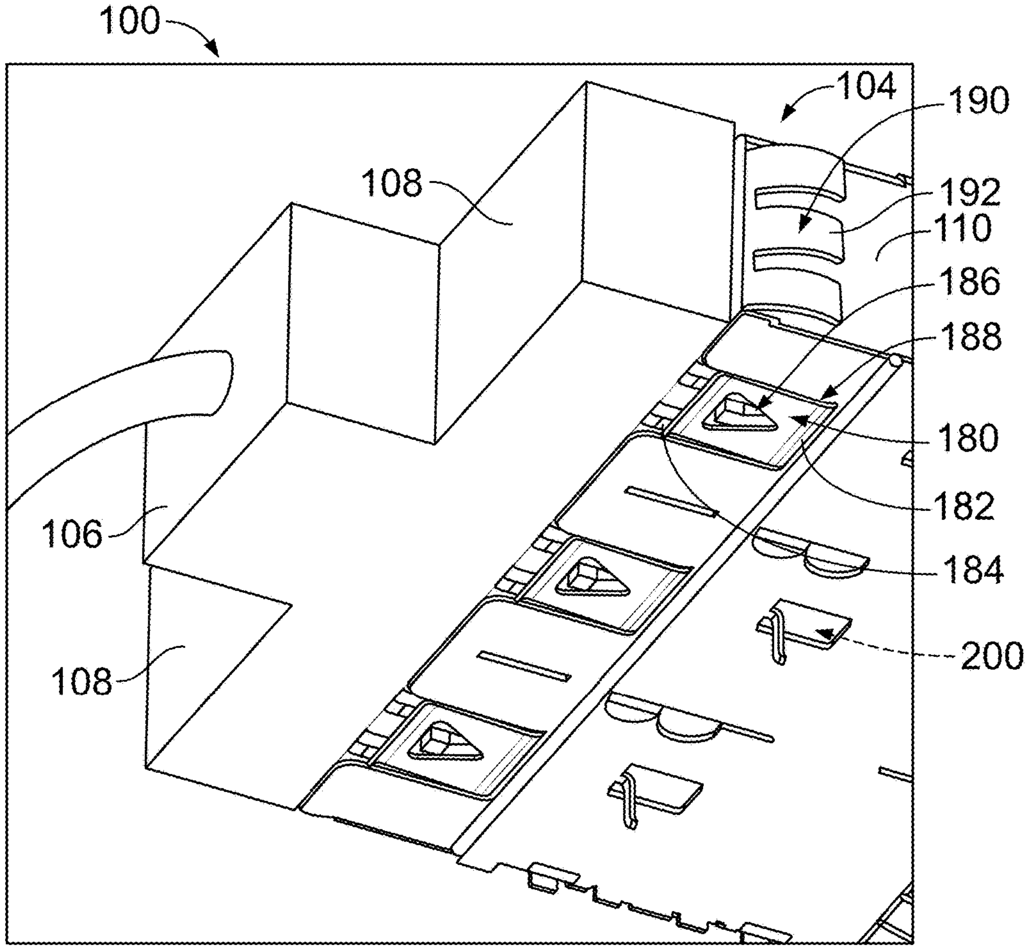
FIG. 2 is a bottom perspective view of a portion of the communication system in accordance with an exemplary embodiment.

FIG. 1 is a top perspective view of a communication system 100 formed in accordance with an exemplary embodiment. FIG. 2 is a bottom perspective view of a portion of the communication system 100 in accordance with an exemplary embodiment. The communication system 100 includes a circuit board 102 (FIG. 1) and a receptacle connector assembly 104 mounted to the circuit board 102. Pluggable modules 106 are configured to be electrically connected to the receptacle connector assembly 104. The pluggable modules 106 are electrically connected to the circuit board 102 through the receptacle connector assembly 104.

Prior to connection of the pluggable module(s) 106, or when the system is utilized without the pluggable module(s) 106, port covers 108 may be plugged into the receptacle connector assembly 104. The port covers 108 protect the receptacle connector assembly 104 from damage, such as dust or debris from entering the receptacle connector assembly 104 and from electro-magnetic interference (EMI) exiting the receptacle connector assembly 104. FIGS. 1 and 2 are shown with the pluggable module 106 coupled to the center port and port covers 108 coupled to the outer ports.

However, any of the ports may receive the pluggable modules 106 or the port covers 108. In an exemplary embodiment, the pluggable portions of the port covers 108 have similar dimensions as the pluggable portions of the pluggable modules 106 to fit the pluggable modules 106 and the port covers 108 in the ports. The dimensions may be set by a particular standard.

In an exemplary embodiment, the receptacle connector assembly 104 includes a receptacle cage 110 and one or more receptacle connectors 112 (shown in phantom) received in the receptacle cage 110. The receptacle cage 110 surrounds the receptacle connector(s) 112 and provides electrical shielding for the receptacle connector 112. In various embodiments, the receptacle connector 112 is a card edge connector having a housing holding receptacle contacts arranged along a card slot for electrical connection with the corresponding pluggable module 106. The pluggable modules 106 are loaded into the receptacle cage 110 and are at least partially surrounded by the receptacle cage 110.

In an exemplary embodiment, the receptacle connector assembly 104 includes EMI absorbers 200 arranged in the receptacle cage 110 at predetermined locations to improve EMI shielding and reduce EMI leakage through the ports. The EMI absorbers 200 reduce EMI leakage when either the pluggable modules 106 or the port covers 108 are received in the ports. The EMI absorbers 200 are located along interior surfaces of the receptacle cage 110, such as the top and/or the bottom and/or the rear and/or the sides. In an exemplary embodiment, a majority of the interior surfaces of the receptacle cage 110 are covered by the EMI absorbers 200.

In an exemplary embodiment, the receptacle cage 110 includes a deflectable latch 180 (FIG. 2) for securing the pluggable module 106 or the port cover 108 in the corresponding port. The deflectable latch 180 may be provided at the bottom of the receptacle cage 110 proximate to the front of the receptacle cage 110. The deflectable latch 180 extends between a fixed end 182 and a free end 184. The free end 184 is at the front end in the illustrated embodiment. The deflectable latch 180 includes an opening 186 that receives a latching feature of the pluggable module 106 or the port cover. Slots 188 are formed along the sides of the deflectable latch 180 to allow movement of the deflectable latch 180 relative to the receptacle cage 110. The slots 188 and/or the opening 186 may form leakage areas for EMI. In an exemplary embodiment, the EMI absorbers 200 are positioned within the receptacle cage 110 to reduce EMI leakage due to the deflectable latch 180.

In various embodiments, a gasket 190 is provided at the front of the receptacle cage 110. The gasket 190 may surround the ports. The gasket 190 includes deflectable spring beams 192. The spring beams 192 of the gasket 190 may extend into the interior of the receptacle cage 110 to interface with the pluggable modules 106. The spring beams 192 of the gasket 190 may extend along the exterior of the receptacle cage 110 to interface with a panel or bezel. The spaces between the spring beams 192 may form leakage areas for EMI. In an exemplary embodiment, the EMI absorbers 200 are positioned within the receptacle cage 110 to reduce EMI leakage due to the gasket 190.

Figure 3:
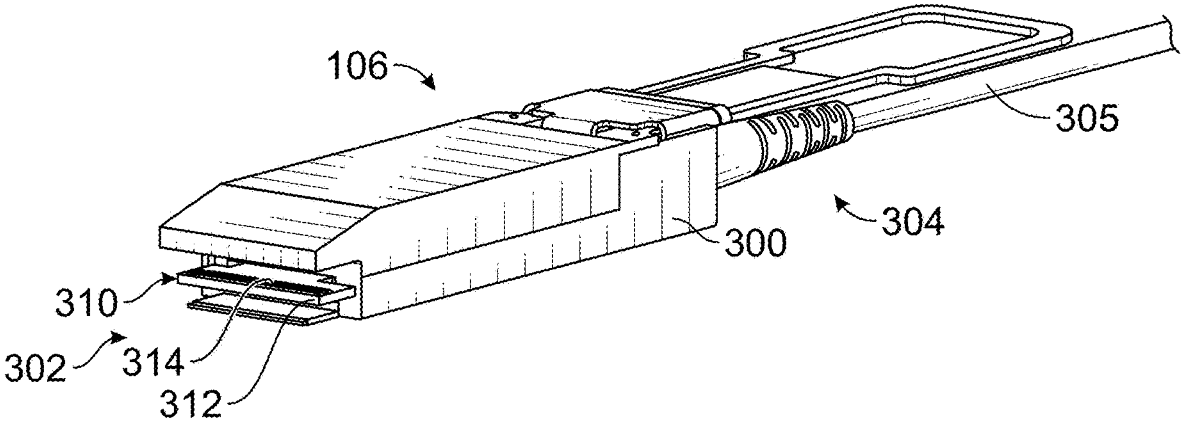
FIG. 3 is a perspective view of the pluggable module in accordance with an exemplary embodiment.

FIG. 3 is a perspective view of the pluggable module 106 in accordance with an exemplary embodiment. The pluggable module 106 has a pluggable body 300, which may be defined by one or more shells. The pluggable body 300 may be thermally conductive and/or may be electrically conductive, such as to provide EMI shielding for the pluggable module 106. The pluggable body 300 includes a mating end 302 and an opposite cable end 304. The mating end 302 is configured to be inserted into the corresponding module channel 118 (shown in FIG. 1). A cable 305 extends from the cable end 304 to another component within the system.

The pluggable module 106 includes a module circuit board 310 that is configured to be communicatively coupled to the receptacle connector 112 (shown in FIG. 1). For example, the module circuit board 310 may be plugged into the card slot of the receptacle connector 112. The module circuit board 310 is accessible at the mating end 302. The module circuit board 310 has a card edge 312 extending between a first or upper surface and a second or lower surface at a mating end of the module circuit board 310. The module circuit board 310 includes mating contacts 314, such as pads or circuits, at the card edge 312 configured to be mated with the receptacle connector 112. In an exemplary embodiment, the mating contacts 314 are provided on the upper surface and the lower surface. The module circuit board 310 may include components, circuits and the like used for operating and or using the pluggable module 106. For example, the module circuit board 310 may have conductors, traces, pads, electronics, sensors, controllers, switches, inputs, outputs, and the like associated with the module circuit board 310, which may be mounted to the module circuit board 310, to form various circuits.

Figure 4:
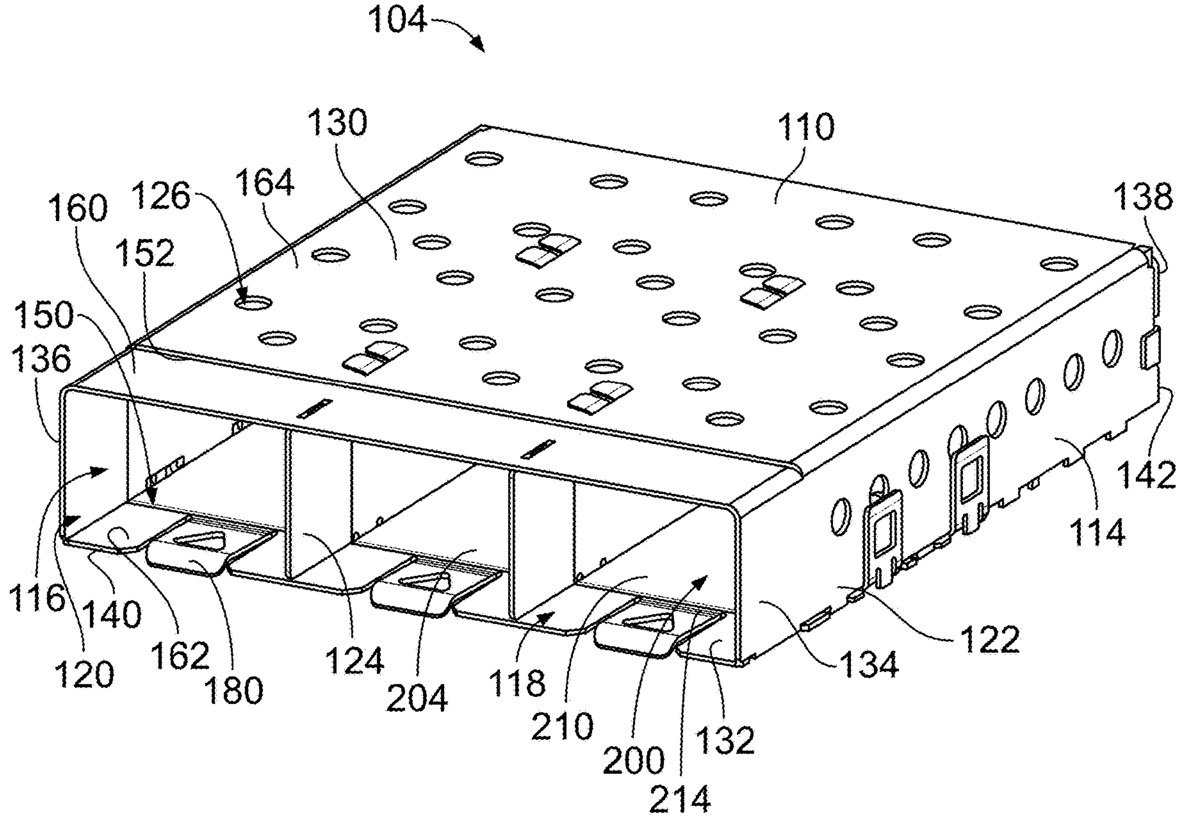
FIG. 4 is a top perspective view of the receptacle cage in accordance with an exemplary embodiment.
Figure 5:
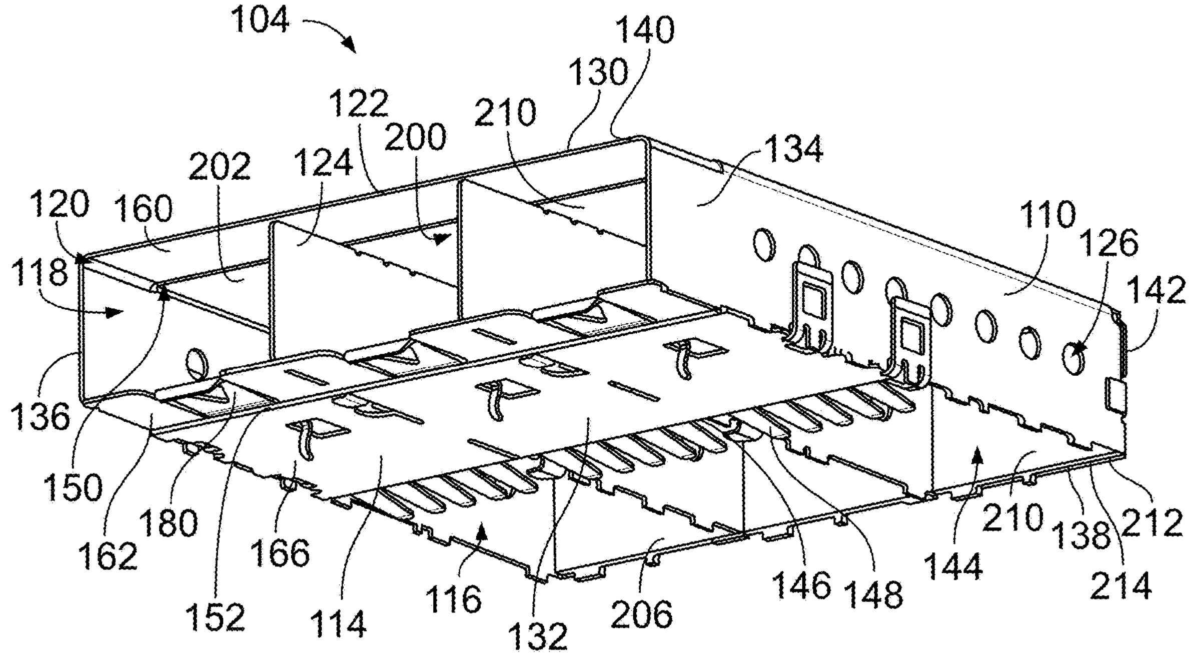
FIG. 5 is a bottom perspective view of the receptacle cage in accordance with an exemplary embodiment.

FIG. 4 is a top perspective view of the receptacle cage 110 in accordance with an exemplary embodiment. FIG. 5 is a bottom perspective view of the receptacle cage 110 in accordance with an exemplary embodiment. The receptacle cage 110 includes a plurality of cage walls 114 forming a cavity 116 including at least one module cavity 116. The cage walls 114 may divide the cavity 116 into a plurality of module channels 118. Each module channel 118 receives a corresponding pluggable module 106 or port cover 108 (both shown in FIGS. 1 and 2). The cage walls 114 may be solid walls or may be perforated walls (for example, with small openings) to allow airflow therethrough. For example, the cage walls 114 may include airflow openings 126. One or more of the cage walls 114 may include an opening for a heat sink. In an exemplary embodiment, the cage walls 114 are stamped and formed metallic walls that provide shielding for the pluggable modules 106 and the receptacle connectors 112. One or more of the cage walls 114 may be integral, being formed from a common metal sheet that is formed (for example, bent) into the various walls.

In the illustrated embodiment, the receptacle cage 110 includes a single row of module channels 118. However, in alternative embodiments, the receptacle cage may include multiple rows of module channels 118, such as stacked module channels 118 including upper and lower module channels. The receptacle cage 110 has module ports 120 that open to the module channels 118. The pluggable modules 106 are plugged into the module channels 118 through the module ports 120. Any number of the module channels 118 may be provided in various embodiments. In the illustrated embodiment, the receptacle cage 110 includes three module channels 118 ganged together and arranged in a single row (1×3). In other embodiments, greater or fewer module channels 118 may be provided, such as 1×2, 1×4, 1×8, and the like. In other embodiments, the module channels 118 may be stacked, such as 2×2, 3×2, 4×2, and the like.

In an exemplary embodiment, the cage walls 114 of the receptacle cage 110 include exterior walls 122 and one or more interior walls 124. The exterior walls 122 form the cavity 116. The interior wall(s) 124 are located in the cavity 116 and divide the cavity 116 into the module channels 118. The interior wall(s) 124 are divider walls that separate the module channels 118 from each other and provide electrical shielding between the module channels 118 on either side of the interior wall 124. The exterior walls 122 provide external shielding for the module channels 118, such as along the top, the bottom, the rear and the sides of some of the module channels 118. In an exemplary embodiment, the EMI absorbers 200 are coupled to corresponding exterior walls 122 to provide EMI suppression along the exterior walls 122. The EMI absorbers 200 may be coupled to corresponding interior walls 124 in other various embodiments to provide EMI suppression along the interior walls 124.

The exterior walls 122 include an upper wall 130, a lower wall 132, a first side wall 134, a second side wall 136, and a rear wall 138. The first and second side walls 134, 136 extend between the upper wall 130 and the lower wall 132. The lower wall 132 may be configured to rest on the circuit board 102 (FIG. 1). However, in alternative embodiments, the lower wall 132 may be elevated a distance above the circuit board 102 defining a gap below the lower wall 132, such as for airflow. The upper wall 130, the lower wall 132, the side walls 134, 136, and the rear wall 138 define the cavity 116. The upper wall 130, the lower wall 132, the side walls 134, 136, and the rear wall 138 define the exterior of the receptacle cage 110.

The cage walls 114 extend between a front end 140 and a rear end 142 of the receptacle cage 110. The module ports 120 are provided at the front end 140. The latch 180 is provided at the front end 140. The rear wall 138 is provided at the rear end 142. In an exemplary embodiment, a connector opening 144 is defined between a rear edge 146 of the lower wall 132 and the rear wall 138. The connector opening 144 receives the receptacle connector 112 (FIG. 1). The lower wall 132 may include spring beams 148 extending from the rear edge 146 configured to interface with the host circuit board 102 and/or the pluggable module 106.

In an exemplary embodiment, the interior walls 124 extend between the front end 140 and the rear end 142. In the illustrated embodiment, the interior walls 124 are oriented vertically. For example, the interior walls 124 are parallel to the side walls 134, 136. The interior walls 124 extend between the upper wall 130 and the lower wall 132. In an exemplary embodiment, the interior walls 124 are connected to the upper wall 130, the lower wall 132, and the rear wall 138.

In various embodiments, other interior walls 124 may separate or divide the cavity 116 into upper and lower module channels 118. For example, a port separator (not shown) may be provided in the cavity 116 to form an upper module channel above the port separator and a lower module channel below the port separator. The port separator may be U-shaped, such as including upper and lower port separator walls and a front port separator wall between the upper and lower module channels. The upper and lower port separator walls define the upper and lower module channels. A space may be defined between the upper and lower port separator walls, such as for airflow, for a heat sink, for routing light pipes, or for other purposes. In an exemplary embodiment, the EMI absorbers 200 may be coupled to the upper and lower port separator walls to provide EMI suppression along the upper and lower port separator walls.

Each EMI absorber 200 is a near field absorber designed to eliminate or reduce undesired noise, such as at predetermined or target frequencies. The EMI absorber 200 absorbs EMI field generated by the electrical components. The EMI absorber 200 may reduce or eliminate emissions, crosstalk, and oscillations. In an exemplary embodiment, the EMI absorber 200 is manufactured from an elastomer material. The EMI absorber 200 may be manufactured from an electrically lossy material. The EMI absorber 200 may be electrically non-conductive. In various embodiments, the EMI absorber 200 is a polymer resin or rubber material loaded with soft magnetic flake particles. In other various embodiments, the EMI absorber 200 may be a non-conductive foam. The EMI absorber 200 may be a sheet or film. The EMI absorber 200 may be flexible. The EMI absorber 200 may be an electrical insulator. The EMI absorbers 200 are used to absorb radar and microwaves. The EMI absorbers 200 may be used to absorb RF energy. In an exemplary embodiment, the EMI absorbers 200 dampen internal resonances in the module channel 118 and/or along the cage walls 114. The EMI absorbers 200 are manufactured from an EMI absorbing material having high permeability to attenuate the energy of incident electromagnetic waves on the cage walls 114 or in the module channel 118. The EMI absorbing material is a high-permeability material. In various embodiments, the EMI absorbing material has a higher permeability than the metal material of the cage walls 114.

In an exemplary embodiment, the receptacle connector assembly 104 includes a plurality of the EMI absorbers 200. For example, each module channel 118 includes an upper EMI absorber 202, a lower EMI absorber 204, and a rear EMI absorber 206. In other embodiments, each module channel 118 may include side EMI absorbers (not shown). The upper EMI absorber 202 extends along the upper wall 130 above the module channel 118. The lower EMI absorber 204 extends along the lower wall 132 below the module channel 118. The rear EMI absorber 206 extends along the rear wall 138 rearward of the module channel 118. In an exemplary embodiment, the upper EMI absorber 202 covers a majority of the upper wall 130, the lower EMI absorber 204 covers a majority of the lower wall 132, and the rear EMI absorber 206 covers a majority of the rear wall 138. In various embodiments, the upper EMI absorber 202 substantially covers the entire surface of the upper wall 130 (for example, greater than 90%), the lower EMI absorber 204 substantially covers the entire surface of the lower wall 132 (for example, greater than 90%), and the rear EMI absorber 206 substantially covers the entire surface of the lower wall 138 (for example, greater than 90%).

Each EMI absorber 200 includes an inner surface 210 and a mounting surface 212 opposite the inner surface 210. The EMI absorber 200 includes edges 214. The inner surface 210 faces the module channel 118. The mounting surface 212 faces the interior of the corresponding cage wall 114. The mounting surface 212 may be secured to the cage wall 114, such as using adhesive. The inner surface 210 and/or the mounting surface 212 may be planar. Optionally, the EMI absorber 200 may include airflow openings (see for example FIG. 6) aligned with the airflow openings 126 to allow thermal transfer through the EMI absorber 200 and the corresponding cage wall 114. The EMI absorber 200 may include an opening aligned with the heat sink opening in the cage wall to receive the heatsink through the EMI absorber 200 to allow thermal transfer through the EMI absorber 200.

In an exemplary embodiment, the cage walls 114 include pockets 150 that receive the EMI absorbers 200. The cage walls 114 may be drawn outward to form the pockets 150. The pockets 150 accommodate the EMI absorbers 200 to remove the EMI absorbers 200 from the module channel 118, such as to prevent interference with the pluggable module 106 when the pluggable module 106 is loaded into the module channel 118. For example, the pockets 150 recess the EMI absorbers 200 to prevent interference. In an exemplary embodiment, the upper wall 130 and the lower wall 132 are non-planar. For example, the upper wall 130 and the lower wall 132 may be stepped outward to form the pockets 150 in the upper and lower walls 130, 132. The upper and lower walls 130, 132 include steps 152 to form the pockets 150. The step 152 has a height approximately equal to a thickness of the EMI absorber 200 to form the pocket 150 having sufficient depth to receive the EMI absorber 200. In an exemplary embodiment, EMI absorber 200 is positioned in the pocket 150 such that the inner surface 210 is positioned generally coplanar with a portion of the corresponding cage wall 114, such as a front portion of the corresponding cage wall 114 (for example, at the module port 120). In other embodiments, the EMI absorber 200 is positioned in the pocket 150 such that the inner surface 210 is recessed outward relative to the forward portion of the corresponding cage wall 114.

In an exemplary embodiment, the upper wall 130 includes an upper port wall 160 at the module port 120 and the lower wall 132 includes a lower port wall 162. The upper port wall 160 is a portion of the upper wall 130. The upper port wall 160 is located forward of the step 152. The upper port wall 160 may be significantly shorter than a rear portion or pocket wall 164 of the upper wall 130. For example, the upper port wall 160 extends a first depth from the front 140 that is less than half the overall depth of the module channel 118. As such, a greater length of the upper wall 130 is available for the upper EMI absorber 202. The pocket wall 164 of the upper wall 130 is located rearward of the step 152. The pocket wall 164 extends along the pocket 150. The pocket wall 164 may extend from the step 152 to the rear wall 138. The upper EMI absorber 202 is coupled to and covers the pocket wall 164 of the upper wall 130. In an exemplary embodiment, the upper EMI absorber 202 is positioned in the pocket 150 such that the inner surface 210 is positioned generally coplanar with (or recessed outward relative to) the interior of the upper port wall 160. The lower port wall 162 is a portion of the lower wall 132. The lower port wall 162 is located forward of the step 152. The deflectable latch 180 is provided in the lower port wall 162. The lower port wall 162 may be significantly shorter than a rear portion or pocket wall 166 of the lower wall 132. The pocket wall 166 of the lower wall 132 is located rearward of the step 152. The pocket wall 166 extends along the pocket 150. The pocket wall 166 may extend from the step 152 to the rear edge 146 of the lower wall 132. The lower EMI absorber 204 is coupled to and covers the pocket wall 166 of the lower wall 132. In an exemplary embodiment, the lower EMI absorber 204 is positioned in the pocket 150 such that the inner surface 210 is positioned generally coplanar with (or recessed outward relative to) the interior of the lower port wall 162.

The module port 120 is the forward-most portion of the module channel 118. For example, the module port 120 is the portion forward of the steps 152. The module port 120 is the portion having the deflectable latch 180. The module port 120 is defined by the upper port wall 160, the lower port wall 162, and side walls defined by the forward portion of the side wall 134, 136 or the interior (divider) walls 124. The module port 120 guides loading of the pluggable module 106 into the module channel 118. In an exemplary embodiment, the module port 120 has dimensions (height and width) corresponding to outer dimensions of the pluggable module 106. The dimensions of the module port 120 may be defined by a specification, such as an SFP, QSFP, OSFP or other specification. The specification may dictate height, width, latch location, and the like at the module port 120 to ensure that a certain pluggable module 106 may be plugged into the module port 120. However, rearward of the latch 180, the dimensions of the module channel may be altered (for example, increased) to accommodate the EMI absorbers 200. In an exemplary embodiment, the module channel 118 has a first height forward of the steps 152 and a second height rearward of the steps 152, which is greater than the first height. As such, the module channel 118 is taller along the pockets 150 compared to along the module port 120 to receive the EMI absorbers 200. In an exemplary embodiment, then the EMI absorbers 200 are located in the pockets 150, the height of the module channel 118 between the inner surfaces 210 may be the same as the height of the module channel 118 along the module port 120.

Figure 6:
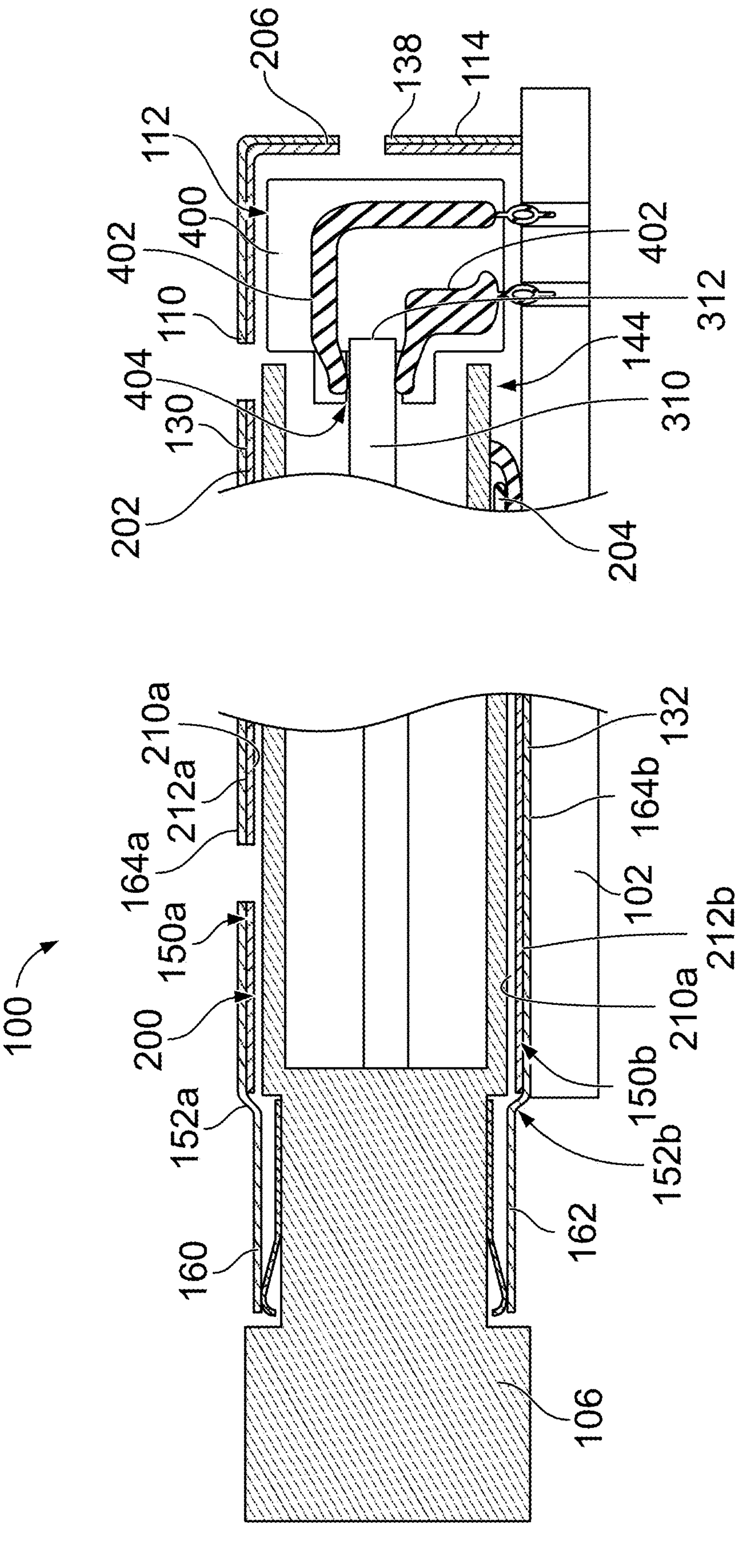
FIG. 6 is a cross sectional view of a portion of the communication system in accordance with an exemplary embodiment showing the pluggable module plugged into the receptacle cage.

FIG. 6 is a cross sectional view of a portion of the communication system 100 in accordance with an exemplary embodiment showing the pluggable module 106 plugged into the receptacle cage 110. FIG. 6 shows the mating end of the pluggable module 106 coupled to the receptacle connector 112.

The receptacle connector 112 includes a housing 400 holding receptacle contacts 402. The housing 400 has a card slot 404 configured to receive the card edge 312 of the module circuit board 310. The receptacle contacts 402 are located in the card slot 404 to electrically connect to the module circuit board 310. The receptacle contacts 402 are configured to be electrically connected to the host circuit board 102.

In an exemplary embodiment, the EMI absorbers 200 are located proximate to the receptacle connector 112. For example, the upper EMI absorber 202 is located above the receptacle connector 112, the lower EMI absorber 204 is located forward of the connector opening 144 and the receptacle connector 112, and the rear EMI absorber 206 is located rearward of the receptacle connector 112. The upper EMI absorber 202, the lower EMI absorber 204, and the rear EMI absorber 206 absorb the electromagnetic energy along the cage walls 114 to improve performance, such as by suppressing EMI.

In an exemplary embodiment, the upper and lower EMI absorbers 202, 204 extend along the upper and lower walls 130, 132, such as between the walls 130, 132 and the pluggable module 106. The upper EMI absorber 202 is located in the upper pocket **150*a* and extends along the pocket wall 164*a* of the upper wall 130 above the module channel 118. The upper EMI absorber 202 is located rearward of the step 152*a*. The mounting surface 212*a* of the upper EMI absorber 202 is coupled to the pocket wall 164*a*. The inner surface 210*a* of the upper EMI absorber 202 faces the pluggable module 106. In an exemplary embodiment, the inner surface 210*a* is coplanar with (or recessed outward relative to) the interior of the upper port wall 160. The lower EMI absorber 204 is located in the lower pocket 150*b* and extends along the pocket wall 164*b* of the lower wall 132 below the module channel 118. The lower EMI absorber 204 is located rearward of the step 152*b*. The mounting surface 212*b* of the lower EMI absorber 202 is coupled to the pocket wall 164*b*. In an exemplary embodiment, the inner surface 210*b* is coplanar with (or recessed outward relative to) the interior of the lower port wall 162**.

In an exemplary embodiment, the rear EMI absorber 206 extends along the rear wall 138. The rear EMI absorber 206 may be located in a rear pocket. The rear EMI absorber 206 is located rearward of the receptacle connector 112. The rear EMI absorber 206 absorbs EMI along the rear wall 138, such as to enhance performance of the receptacle connector 112.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle cage comprising:

a plurality of cage walls forming a cavity, the cage walls being electrically conductive, the cavity defining a module channel configured to receive a pluggable module, the plurality of cage walls including an upper wall above the module channel and a lower wall below the module channel, the plurality of cage walls including a port at a front of the receptacle cage providing access to the module channel, wherein the pluggable module is plugged into the module channel through the port;

an upper EMI absorber extending along the upper wall above the module channel, the upper EMI absorber including a mounting surface mounted to the upper wall and an inner surface facing the module channel, the inner surface of the upper EMI absorber being coplanar with or recessed outward relative to a portion of the upper wall; and a lower EMI absorber extending along the lower wall below the module channel, the lower EMI absorber including a mounting surface mounted to the lower wall and an inner surface facing the module channel, the inner surface of the lower EMI absorber being coplanar with or recessed outward relative to a portion of the lower wall.

2. The receptacle cage of claim 1, wherein the plurality of cage walls includes a rear wall, the receptacle cage further comprising a rear EMI absorber extending along the rear wall rearward of the module channel.

3. The receptacle cage of claim 1, wherein the plurality of cage walls includes a side wall between the upper wall and the lower wall, the receptacle cage further comprising a side EMI absorber extending along the side wall.

4. The receptacle cage of claim 1, wherein the upper EMI absorber and the lower EMI absorber are manufactured from conductive elastomer materials.

5. The receptacle cage of claim 1, wherein the upper EMI absorber and the lower EMI absorber are manufactured from an electrically lossy material.

6. The receptacle cage of claim 1, wherein the lower wall includes a deflectable latch at the port proximate to the front of the receptacle cage configured to latchably couple to the pluggable module, the lower EMI absorber located adjacent the deflectable latch and extending rearward of the deflectable latch.

7. The receptacle cage of claim 1, wherein the upper wall includes an upper pocket receiving the upper EMI absorber.

8. The receptacle cage of claim 1, wherein the upper EMI absorber includes a mounting surface mounted to the upper wall and an inner surface facing the module channel, the inner surface of the upper EMI absorber being coplanar with or recessed outward relative to a portion of the upper wall, the lower EMI absorber including a mounting surface mounted to the lower wall and an inner surface facing the module channel, the inner surface of the lower EMI absorber being coplanar with or recessed outward relative to a portion of the lower wall.

9. The receptacle cage of claim 1, wherein the upper wall includes an upper port wall at the port extending a first depth from the front and an upper pocket wall extending rearward of the upper port wall defining an upper pocket rearward of the upper port wall, the upper EMI absorber being received in the upper pocket and secured to the upper pocket wall, an inner surface of the EMI absorber being generally coplanar with or recessed outward relative to the upper port wall.

10. The receptacle cage of claim 1, wherein the upper wall is non-planar having a step, the module channel having a first height forward of the step and a second height rearward of the step, the second height being greater than the first height, the upper EMI absorber being located rearward of the step.

11. The receptacle cage of claim 1, wherein the cage walls include a divider wall in the cavity, the module channel located to a first side of the divider wall, a second module channel located to a second side of the divider wall, the receptacle cage further comprising a second upper EMI absorber extending along the upper wall above the second module channel and a second lower EMI absorber extending along the lower wall below the second module channel.

12. The receptacle cage of claim 1, wherein inner surfaces of all of the plurality of cage walls include corresponding EMI absorbers surrounding the module channel.

13. The receptacle cage of claim 12, wherein the EMI absorbers on adjoining walls interfacing with each other.

14. A receptacle cage comprising:

a plurality of cage walls forming a cavity, the cage walls being electrically conductive, the cavity defining a module channel configured to receive a pluggable module, the plurality of cage walls including an upper wall above the module channel and a lower wall below the module channel, wherein the upper wall includes at least one opening therethrough, the plurality of cage walls including a port at a front of the receptacle cage providing access to the module channel, wherein the pluggable module is plugged into the module channel through the port;

an upper EMI absorber extending along the upper wall above the module channel, the upper EMI absorber including at least one absorber opening aligned with the at least one upper wall opening to allow thermal transfer through the upper EMI absorber and the upper wall; and a lower EMI absorber extending along the lower wall below the module channel.

15. A receptacle assembly comprising:

a receptacle cage configured to be mounted to a host circuit board, the receptacle cage including a plurality of cage walls forming the cavity, the cage walls being electrically conductive, the cavity defining a module channel configured to receive a pluggable module, the plurality of cage walls including an upper wall above the module channel, a lower wall below the module channel, and a rear wall rearward of the module channel, the plurality of cage walls including a port at a front of the receptacle cage providing access to the module channel, wherein the pluggable module is plugged into the module channel through the port;

a receptacle connector received in the cavity of the receptacle cage forward of the rear wall, the receptacle connector including a housing holding receptacle contacts, the housing having a card slot configured to receive a card edge of a module circuit board of a pluggable module, the receptacle contacts located in the card slot to electrically connect to the module circuit board, the receptacle contacts configured to be electrically connected to the host circuit board;

an upper EMI absorber extending along the upper wall above the module channel, wherein the upper EMI absorber extends to the rear wall;

a lower EMI absorber extending along the lower wall below the module channel; and a rear EMI absorber extending along the rear wall rearward of the receptacle connector.

16. The receptacle assembly of claim 15, wherein the upper EMI absorber extends along the upper wall above the receptacle connector.

17. The receptacle assembly of claim 15, wherein a connector opening is defined between a rear edge of the lower wall and the rear wall, the receptacle connector passing through the connector opening, the lower EMI absorber extending along the lower wall to the rear edge.

18. The receptacle assembly of claim 15, wherein the lower wall includes a deflectable latch at the port proximate to the front of the receptacle cage configured to latchably couple to the pluggable module, the lower EMI absorber located adjacent the deflectable latch and extending rearward of the deflectable latch.

19. The receptacle assembly of claim 15, wherein the upper EMI absorber includes a mounting surface mounted to the upper wall and an inner surface facing the module channel, the inner surface of the upper EMI absorber being coplanar with or recessed outward relative to a portion of the upper wall, the lower EMI absorber including a mounting surface mounted to the lower wall and an inner surface facing the module channel, the inner surface of the lower EMI absorber being coplanar with or recessed outward relative to a portion of the lower wall.

20. The receptacle assembly of claim 15, wherein inner surfaces of all of the plurality of cage walls include corresponding EMI absorbers surrounding the module channel.

21. The receptacle assembly of claim 20, wherein the EMI absorbers on adjoining walls interfacing with each other.

22. The receptacle assembly of claim 15, wherein the upper wall includes at least one opening therethrough, the upper EMI absorber including at least one absorber opening aligned with the at least one upper wall opening to allow thermal transfer through the upper EMI absorber and the upper wall.

23. An electrical connector system comprising:

a host circuit board having an upper surface;

a receptacle assembly mounted to the upper surface of the host circuit board, the receptacle assembly including a receptacle cage including a plurality of cage walls forming a cavity, the plurality of cage walls including airflow openings therethrough, a receptacle connector received in the cavity, an upper EMI absorber received in the cavity, and a lower EMI absorber received in the cavity, at least one of the upper EMI absorber and the lower EMI absorber including at least one absorber opening aligned with the corresponding airflow openings in the corresponding cage wall to allow airflow therethrough, the cage walls being electrically conductive and being coupled to the host circuit board, the cavity defining a module channel configured to receive a pluggable module, the plurality of cage walls including an upper wall above the module channel, a lower wall below the module channel, and a rear wall rearward of the module channel, the upper EMI absorber extending along the upper wall above the module channel, the lower EMI absorber extending along the lower wall below the module channel.

24. The electrical connector system of claim 23, wherein inner surfaces of all of the plurality of cage walls include corresponding EMI absorbers surrounding the module channel.

* * * * *